(12) United States Patent
Kool

(10) Patent No.: US 7,749,304 B2
(45) Date of Patent: Jul. 6, 2010

(54) METHOD FOR STORING HYDROGEN, AND RELATED ARTICLES AND SYSTEMS

(75) Inventor: Lawrence Bernard Kool, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1010 days.

(21) Appl. No.: 11/342,495

(22) Filed: Jan. 30, 2006

(65) Prior Publication Data

US 2007/0175505 A1    Aug. 2, 2007

(51) Int. Cl.
  *B01D 53/22* (2006.01)
  *F17B 1/00* (2006.01)
  *B01J 8/00* (2006.01)
(52) U.S. Cl. ............... 95/55; 96/4; 96/7; 48/174; 48/190; 429/17; 206/0.6
(58) Field of Classification Search ............... 95/52, 95/55; 96/4, 7; 48/190, 174; 429/12, 17, 429/34; 977/778, 779, 780, 962; 206/0.6; 420/900
See application file for complete search history.

(56) References Cited

U.S. PATENT DOCUMENTS

| 4,022,348 | A | * | 5/1977 | Solomon | ............. 222/3 |
| 4,163,637 | A | | 8/1979 | Hendricks | |
| 4,302,217 | A | * | 11/1981 | Teitel | ............. 48/190 |
| 4,327,192 | A | | 4/1982 | Henderson et al. | |
| 4,477,492 | A | | 10/1984 | Bergna et al. | |
| 4,929,400 | A | | 5/1990 | Rembaum et al. | |
| 4,960,351 | A | | 10/1990 | Kendall, Jr. et al. | |
| 6,725,671 | B2 | | 4/2004 | Bishop | |
| 7,094,369 | B2 | * | 8/2006 | Buiser et al. | ............. 264/7 |
| 7,186,474 | B2 | * | 3/2007 | Jang | ............. 429/17 |
| 2002/0106501 | A1 | | 8/2002 | Debe | |
| 2004/0213998 | A1 | | 10/2004 | Hearley et al. | |
| 2004/0230084 | A1 | | 11/2004 | Yagi | |
| 2006/0026900 | A1 | * | 2/2006 | Jang | ............. 48/190 |

OTHER PUBLICATIONS

L. B. Kool, "Polymer shells by the droplet method," J. Vac. Sci. Technol., vol. 18, No. 3, Apr. 1981, pp. 1233-1237.
R. Crawley, "A hollow droplet generator for polymer shell production," J. Vac. Sci. Technol. A, vol. 4, No. 3, May/Jun. 1986, pp. 1138-1141.
I. Lewkowicz, "Spherical hydrogen targets for laser-produced fusion," J. Vac. Sci. Technol, vol. 7, 1974, pp. L61-L62.
"Concise encyclopedia of chemical technology," A wiley-interscience publication, 1985, pp. 1228-1229.

* cited by examiner

*Primary Examiner*—Jason M Greene
(74) *Attorney, Agent, or Firm*—Francis T. Coppa

(57) ABSTRACT

A method for storing hydrogen is described. The hydrogen is infused into hollow spheres. The spheres are made from a polymer which has a tensile strength sufficient to contain hydrogen under selected internal pressure conditions; and has a permeation coefficient which can be adjusted under variable humidity conditions. Adjustment of the humidity level after the hydrogen is infused results in the walls of the spheres becoming impermeable to hydrogen. The hydrogen stored in the spheres can then be released at a desired time by readjusting the humidity level. The released hydrogen can be directed to any type of equipment which is fueled by hydrogen or otherwise uses the gas. Related articles and systems are also described.

30 Claims, 1 Drawing Sheet

METHOD FOR STORING HYDROGEN, AND RELATED ARTICLES AND SYSTEMS

BACKGROUND OF THE INVENTION

This invention relates generally to the use and storage of hydrogen gas.

The use of hydrogen for a variety of applications has received a great deal of attention in recent years. For example, hydrogen has been positioned as an alternative to fossil fuels for energy, and for the operation of internal combustion engines in vehicles. Hydrogen can be combined with oxygen via combustion, and via oxidation/reduction reactions in a fuel cell device. Hydrogen-based fuel cells have now become a viable source of energy, with numerous advantages over petroleum-based engines. In general, the fuel cells are more efficient and quiet; operate at lower temperatures; operate with less friction; and are less polluting. As a fuel, hydrogen provides a number of advantages. For example, the gas is very abundant, clean, affordable, and renewable. The primary product of the hydrogen reactions—water—is non-polluting, and can be recycled to regenerate hydrogen and oxygen.

An important factor which can limit the widespread utilization of hydrogen is related to its storage and transport. Hydrogen is flammable over a wide range of concentrations in air, and at low spark temperatures. Thus, the storage and distribution of the gas is highly regulated. Frequently, hydrogen gas is stored at high pressure in a gas cylinder, e.g., a steel or composite tank. The walls of the cylinder need to be quite thick. This requirement makes the container heavy, and difficult to store and transport.

Hydrogen can also be stored in the liquid phase. In fact, hydrogen storage in liquid form can sometimes be more efficient than storage in the gas phase. However, very high-purity hydrogen is usually required. Moreover, since liquification temperatures can be as low as about −253° C., a special container capable of withstanding cryogenic temperatures is usually necessary. These requirements detract from the economic viability of liquid-phase storage.

Hydrogen can also be stored in the form of a metallic compound. For example, a variety of metals—alkali, alkaline earth, boron, aluminum, and the like—combine with hydrogen to form metal hydrides (usually in particulate form). When hydrogen is needed for a specific purpose, the metal hydride compounds can be heated to liberate the hydrogen.

While the storage of hydrogen as a metal alloy is useful in some applications, there are disadvantages as well. For example, the metal component is heavy, adding to the difficulty in transporting the material. Furthermore, the temperature needed to liberate the hydrogen from the metal can be quite high, e.g., greater than about 300° C. Moreover, storage compounds such as sodium hydride are caustic, flammable, and capable of violent reaction with water.

The storage of hydrogen in nanotubes is also being investigated. For example, hydrogen could be incorporated into porous carbon nanotubes. While further work will probably be undertaken on this concept, some of the apparent drawbacks at this stage of development are significant. For example, the nanotubes can be difficult to manufacture. Moreover, they may not be able to withstand the higher gas pressures required for large-scale hydrogen storage.

The use of hollow spheres to store hydrogen has also been studied. For example, a brief description of using glass "microballoons" is provided by I. Lewkowicz, in "Spherical Hydrogen Targets for Laser-Produced Fusion", J. Phys. D: Appl. Phys. Vol. 7, 1974. The article discusses the possibility of using stable glass microballoons as hydrogen containers, and introducing hydrogen into the microballoons by permeation under high pressure. Moreover, Hearley et al discuss the possibility of hydrogen storage in glass microspheres (U.S. Patent Application Publication 2004/0213998 A1). Commercially-available glass spheres have walls which are permeable to hydrogen when they are heated. The spheres are charged with hydrogen by heating them in a high-pressure environment to cause the gas to permeate the walls and migrate into the interior. Once filled, the spheres are cooled, to lock the hydrogen inside. When the hydrogen is needed for a particular end use, the spheres can be re-heated, allowing the gas to permeate out of the hollow interior. The Hearley publication also discusses other potential hydrogen containers, e.g., various microparticles, hollow polymeric microspheres, and metal hydride materials.

The use of glass microspheres to selectively store and release hydrogen is a promising concept, and certainly worthy of additional development. However, there are some disadvantages involved in using glass microspheres. For example, the formation of hollow glass microspheres can be somewhat energy-intensive, because of their relatively high melting point. The microspheres are typically fabricated in a high-temperature drop tower, which can require very precise conditions, e.g., precise temperature and flow control. Moreover, the glass spheres generally exhibit low permeability to hydrogen, which limits the rate at which hydrogen can be infused into the spheres and then released by way of permeation. This drawback can be addressed to some degree by carrying out the permeation at relatively high temperatures, or by releasing the hydrogen in a mechanical manner, e.g., by crushing the spheres. However, the high temperatures clearly result in higher energy costs. Moreover, the destruction of the spheres prevents their re-use, and raises disposal issues as well.

In view of the preceding discussion, it should be apparent that new methods for storing and transporting hydrogen would be of great interest. The methods should be capable of securely storing hydrogen under considerably high pressure, and then releasing the hydrogen upon demand. These processes should also employ a relatively inexpensive storage medium which can be readily adjusted to initiate the flow of hydrogen, or to shut off such flow. The storage medium should also be relatively lightweight, to allow economical transport of the hydrogen. Moreover, the storage process should be compatible with the equipment which makes use of the released hydrogen, e.g., fuel cells. It would also be of considerable interest if the process could be used repeatedly, e.g., employing a storage medium which could be continuously recycled for additional use.

BRIEF DESCRIPTION OF THE INVENTION

One embodiment of this invention is directed to a method for storing hydrogen, comprising the following steps:

(a) infusing hydrogen into hollow spheres which have gas-permeable walls, wherein the spheres comprise a polymer which (i) has a tensile strength sufficient to contain hydrogen under selected internal pressure conditions; and (ii) has a permeation coefficient which can be adjusted under variable humidity conditions; and then (b) adjusting the humidity level so that the walls of the spheres become substantially impermeable to hydrogen, so as to prevent the release of hydrogen from the spheres.

Another embodiment of the invention relates to a collection of hollow polymeric spheres. The spheres have an average diameter in the range of about 50 microns to about 1,000 microns. The interior of the spheres comprises hydrogen gas at a pressure of at least about 3,000 psi.

A further embodiment of the invention is directed to an apparatus or system for storing and delivering hydrogen, comprising:

(A) a hydrogen source;

(B) means for infusing hydrogen from the source into hollow polymeric spheres; retaining the hydrogen within the spheres for a selected period of time; and then releasing the hydrogen from the spheres; and (C) means for directing the released hydrogen to a hydrogen destination.

Other details regarding the invention will become apparent to those skilled in the art, after reference to the following detailed description.

DETAILED DESCRIPTION OF THE INVENTION

Figure 1:
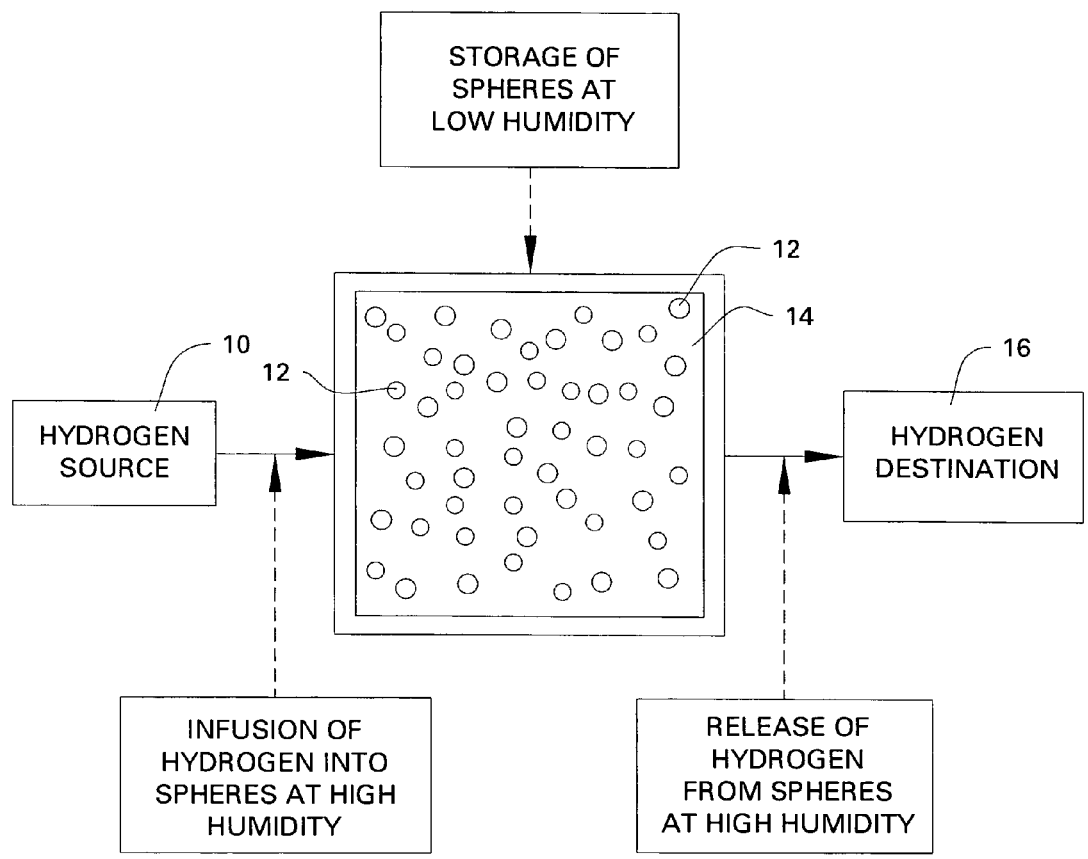
FIG. 1 is a flow diagram for a process according to one embodiment of the present invention.

As mentioned above, hydrogen is infused into hollow spheres formed from polymeric materials which have at least two specified characteristics. First, the polymer, when formed into spheres, should have a tensile strength sufficient to contain hydrogen under selected internal pressure conditions. The internal pressure conditions will depend in part on the quantity of hydrogen desired for storage and eventual release for a particular end use. Another important factor is the desired rate of delivery for the hydrogen, upon release from the spheres.

The term "sphere" is used herein for simplicity, although the spheres may alternatively be described as "shells", "balloons", "microballoons", or "droplets". Moreover, while a geometrically-correct sphere is often desirable, the actual shape of the spheres may vary somewhat, depending on factors such as sphere composition; wall thickness; internal and external pressure conditions, and the like. For example, the sphere may sometimes have a somewhat irregular shape (e.g., being somewhat oblong), as long as the other physical requirements for the sphere are satisfied. Furthermore, although most of the spheres are ideally hollow, a relatively small number of the spheres may be partially filled with the polymer-forming material (e.g., due to the manufacturing process), although this occurrence should not appreciably affect storage performance.

In some instances, the spheres should have a tensile strength sufficient to contain hydrogen at a pressure of at least about 3,000 psi. Specific embodiments call for a tensile strength sufficient to contain hydrogen at a pressure of at least about 5,000 psi, and most preferably, at least about 10,000 psi. It should be noted, however, that the thickness of the walls of the sphere also plays a key role in determining how much internal pressure the spheres can withstand.

The required tensile strength for the walls of the sphere is dependent in large part on the tensile stress exerted on the interior walls. Those skilled in the art are familiar with techniques for calculating the tensile stress exerted on the interior walls of hollow, spherical shells. For example, a description of this type of calculation is provided in "Roark's Formulas for Stress and Strain, Sixth Edition", Roark, R. J., McGraw-Hill, N.Y., e.g., Table 28, page 523, which is incorporated herein by reference.

In brief, the tensile stress σ in the walls of a sphere can be expressed as Equation 1:

$$\sigma = pr/2t, \quad (1)$$

wherein p is the internal pressure within the sphere; r is the internal radius of the sphere; and t is the thickness of the wall of the sphere.

Those skilled in the art understand that other formulae and calculations are also available in the literature to provide additional guidance regarding the desired strength for the spheres. As an example, relevant calculations can be made for "hoop stress", which is the circumferential stress in a material of cylindrical form, when subjected to internal or external pressure. As one non-limiting example, a formula for the hoop stress of a thin-walled cylinder is set forth in U.S. Pat. No. 6,725,671 (Bishop), which is incorporated herein by reference.

Those skilled in the art (e.g., polymer science) understand that the tensile strength of the polymer can be increased by various techniques, e.g., by increasing the molecular weight of the polymer during its polymerization. Moreover, in some cases, it may be possible to form a second layer around the outer wall of the polymer, e.g., a layer which is designed to supplement the tensile strength of the sphere. The material forming the second layer would also have to possess permeation characteristics (discussed below) which are compatible with those of the first layer.

Another important property for the spheres relates to permeation characteristics. As also mentioned above, the polymer for the spheres should have a permeation coefficient which can be adjusted under variable humidity conditions. In simple terms, the permeation coefficient "P" is a measurement of how rapidly and how completely hydrogen permeates a barrier, wall, membrane, and the like. The term "P" can be defined as the product of the diffusion coefficient "F" and the solubility coefficient "S". The concept of a permeation coefficient is discussed, for example, in U.S. Pat. No. 6,894,085, which is incorporated herein by reference. The permeation coefficient is normally independent of the amount of pressure applied against the barrier, but is often inversely proportional to the thickness of the barrier.

In some embodiments, the minimum permeation coefficient for the polymer (to the passage of hydrogen gas) at a selected thickness should be less than about $6.0 \times 10^{-16}$ ($[cm^3]$ $[cm])/([cm^2]$ $[s]$ $[Pa])$, as measured at STP (standard temperature and pressure). Spheres made from polymers with this characteristic are relatively impermeable to hydrogen, e.g., allowing less than about 5% of the incorporated volume of hydrogen to leak out of the sphere over a period of about 2 to about 4 days. In some specific embodiments, the permeation coefficient for the polymer under these conditions should be less than about $6.0 \times 10^{-17}$ ($[cm^3]$ $[cm])/([cm^2]$ $[s]$ $[Pa])$, at STP.

In order to incorporate hydrogen into the spheres, and to release the gas when desired, the permeation coefficient for the polymer at a selected thickness is usually (though not always) greater than about 2,000 times the value of the minimum permeation coefficient set forth above. In some preferred embodiments, the value is greater than about 2,500 times the value of the minimum permeation coefficient. The most appropriate permeation coefficient for this "open porosity" characteristic will depend on various factors, such as the end use for the stored hydrogen; the type and characteristics of the polymer forming the spheres; and the amount of hydrogen required in a given period.

A variety of polymers appear to generally meet the requirements for tensile strength and permeation characteristics. In preferred embodiments, the polymer is one which is soluble in a liquid medium from which the hollow spheres are sometimes formed. Thus, the polymers are usually soluble in an aqueous solvent like water. Moreover, the polymers often have a relatively large number of pendant hydroxyl groups. (Some of the suitable polymers can be characterized as polyols).

Non-limiting examples of polymers which are thought to be suitable for the hollow spheres are polyvinyl alcohol polymers; carbohydrate polymers, polyacrylonitrile, polyamines; combinations of any of the foregoing; and derivatives of any of the foregoing. As used herein, a "polymer" is meant to include copolymers, e.g., those formed by the polymerization of two or more monomers. Moreover, "combinations" of polymers can also refer to physical blends of various polymers. The term polymer is also meant to encompass oligomers, e.g., dimers, trimers and tetramers.

Polyvinyl alcohols are well-known in the art, and are generally represented by the formula

wherein "x" designates the number of repeating units for the polymer, i.e., related to the molecular weight, discussed below. The polymer is usually obtained from polyvinyl acetate by a conventional alcoholysis reaction. Those skilled in the art are familiar with details regarding the preparation of polyvinyl alcohol (PVA), as well as various processing details. As an example, a brief description of methods for making and using polyvinyl alcohol is provided in the "Kirk-Othmer Concise Encyclopedia of Chemical Technology, Wiley-Intersience Publications (1985), pages 1228-1229; and in "Hawley's Condensed Chemical Dictionary", $14^{th}$ Edition, John Wiley & Sons, Inc., (2001), page 904. Both of these references are incorporated herein by reference. PVA is especially suitable for some embodiments of the present invention, because of its tensile strength and permeation characteristics.

As described in the "Kirk-Othmer" text, the physical properties of PVA are controlled in large part by molecular weight and the degree of hydrolysis. The polymer is sometimes characterized in the literature as having three degrees of hydrolysis. PVA is also sometimes characterized as having a series of molecular weight ranges, starting at about 25,000 (nominal $M_n$), and extending to at least about 300,000, with one hydroxyl group per monomer unit. As also described in the "Kirk-Othmer" text, the tensile strength of unplasticized, fully-hydrolyzed PVA is often in the range of about 8,000 psi to about 10,000 psi, at 50% relative humidity. In some instances, the tensile strength for some grades of PVA is reported to be as high as about 15,000 psi, under conditions of very low relative humidity. (Maximum tensile modulus values for PVA are reported to be about 250 Gpa (36,250,000 psi), under minimum relative humidity conditions. In contrast, the maximum tensile modulus value for steel is reported to be 208 Gpa, and the maximum value for glass is reported to be 69-183 Gpa. See "Encyclopedia of Polymer Science and Engineering", $2^{nd}$ Edition, John Wiley & Sons, NY, 1987, p. 702).

Moreover, the permeability of a PVA-based material can be rapidly adjusted by changing humidity levels. For example, at 0% relative humidity, a layer of PVA can have a permeation coefficient ("P") for hydrogen of about $6.72 \times 10^{-16}$ ([cm$^3$] [cm])/([cm$^2$] [s] [Pa]), at STP. When the relative humidity is raised, hydrogen permeability can increase dramatically, e.g., by a factor of at least about 2500. Thus, PVA is especially suitable as a hollow sphere material, because of its capability of allowing rapid entry of hydrogen into the sphere; "locking" in the hydrogen under relatively high pressure, and then rapidly releasing the hydrogen when desired. (Exemplary values for hydrogen permeation through layers of PVA are provided in the "Polymer Handbook", 4th Edition", J. Brandrup, E. H. Immergut, E. A. Glulke, Eds, 1999, John Wiley & Sons, Inc. NY, (Volume 1), p. 550, which is incorporated herein by reference. Moreover, reference to other gas permeation values for PVA may also be helpful for predicting the best permeation characteristics for hydrogen. For example, in the case of nitrogen gas, the permeation coefficient through PVA is reported to be $1.0 \times 10^{-17}$ ([cm$^3$] [cm])/([cm$^2$] [s] [Pa]), at 0% rh (STP), increasing to $2.48 \times 10^{-14}$ ([cm$^3$] [cm])/([cm$^2$] [s] [Pa]), at 100% rh).

As alluded to above, various copolymers or blends of PVA may also be suitable, as long as they meet the tensile strength and permeation requirements discussed above, and are soluble in a solvent which might be used to form the spheres. Non-limiting examples of such materials are polyvinyl acetal, polyvinyl butyral; ethylene-vinyl alcohol (EVOH) copolymers; and various combinations thereof. PVA can also be grafted with other monomers, and can be cross-linked with various chemical additives, such as glyoxal, urea-formaldehydes, and melamine-formaldehydes.

As mentioned above, various carbohydrate polymers are also thought to be suitable for the hollow spheres. As used herein, the term "carbohydrate" is meant to include (among other compounds) various polyhydroxy aldehydes, polyhydroxy ketones, and compounds that can be hydrolyzed to form those types of materials. In general, carbohydrate polymers are well-known in the art. Examples include polysaccharides. Oligomers, e.g., disaccharides, might also be suitable, for relatively low pressure conditions, if the shell wall has a sufficient thickness. Combinations or derivatives of any of the foregoing polymers are also possible.

Non-limiting examples of the polysaccharides are cellulose polymers and starch polymers. Non-limiting examples of the disaccharides are lactose, sucrose, maltose, cellobiose; and various derivatives thereof. Those skilled in the art are familiar with methods for making these polymers, as well as modifying them, e.g., by cross-linking; by the addition of additives; or by the incorporation of additional reactive groups, and the like. Moreover, conventional techniques can be used to adjust both the tensile strength of the polymer (e.g., via molecular weight changes) and its solubility (e.g., the adjustment of hydroxyl functionality for aqueous solvents).

Carbohydrate polymers which are of particular interest for the hollow spheres are the cellulose materials—also well known in the art. (An illustrative description of cellulosic materials, as well as other carbohydrates, is provided in "Organic Chemistry", $5^{th}$ addition, by Morrison and Boyd, Allyn and Bacon, Inc. (1987), e.g., on pages 1279-1343, which is incorporated herein by reference). Cellulose polymers (like starch) are usually made up of chains of D-glucose units, joined by glycoside linkages. The molecular weight (nominal Mn) of cellulose can vary considerably, e.g., from about 10,000 to about 1,000,000.

Many cellulose derivatives may also be suitable for the spheres. Non-limiting examples include cellulose nitrate (nitrocellulose); cellulose acetate; cellophane (rayon); and cellulose ethers. Examples of the ethers are methylcellulose and hydroxyethylcellulose. For each material, an evaluation of tensile strength, permeation characteristics, and solubility can be performed without undue effort. As mentioned above, properties for each polymer can be modified by various techniques. For example, cellophane materials may not exhibit the desired degree of water solubility. However, solubility can be increased by various means, such as increasing the temperature. As another example, a cellulose ether like hydroxylethylcellulose may exhibit good water solubility, but may not have the tensile strength characteristics of a material like PVA. However, its tensile strength could be increased by increasing its molecular weight. Moreover, the wall thickness of the sphere could also be increased, to compensate for lower tensile strength.

Different techniques are possible for making the hollow spheres. In general, the techniques are quite well-known in the art. Choice of a particular technique will depend on many factors, including the tensile, permeation, and solubility characteristics noted above. One example of a suitable method is spray-drying, e.g., as described in U.S. Pat. No. 4,131,542 (Bergna et al), incorporated herein by reference.

Many types of spray-drying techniques are practiced. Most (though not all) generally include the following steps:
  I. Atomization of a feed material into a spray;
  II. Mixing and flow to produce spray-air contact;
  III. Drying of spray by moisture removal; and
  IV. Separation of the dried product from the air.

The characteristics of the dried product are determined by the physical and chemical properties of the feed, and by the conditions used in each of the stages of the process. As described in the Bergna reference, many operational variables which are associated with the atomization and drying operations influence the characteristics of the dried product (i.e., the hollow spheres in this instance). Examples of the factors primarily related to the feed material include: particle size of the feed material; concentration of solids in the feed; viscosity and temperature of the feed; surface tension of the feed solution; and feed rate. Additional factors relate to atomization characteristics, e.g., the type of atomizer used to create a spray for optimum evaporation conditions; as well as atomization energy. Other factors relate to spray-air contact conditions; drying conditions (i.e., drying of the spray); and separation of the dried product from the air. Moreover, additional steps may be undertaken for the final product, depending on its composition, as well as physical and chemical characteristics. For example, the hollow spheres can be washed (e.g., acid-washed), to remove impurities and the like. Moreover, additional heating steps may sometimes be undertaken, to provide a greater degree of curing or hardening for the final product material.

Conventional techniques may be used to supply the feed material (i.e., the sphere-forming polymer) to the spray-drying apparatus. Typically, the polymer is dissolved in a suitable solvent. Many of the polymers are soluble in an aqueous system, e.g., water; or mixtures of water with one or more alcohols. (As those skilled in the art understand, the aqueous system is often in the form of a colloid). In some instances, the polymer is dissolved in a suitable organic solvent or mixture of solvents, such as methylene chloride, toluene, various xylenes, and tetrahydrofuran. Mixtures of aqueous and organic solvents can also sometimes be used. Moreover, the feed "bath"—especially when aqueous—can contain a variety of other conventional additives as well, such as dispersants, deflocculants, anti-settling agents, and surfactants. Other helpful details are also described in U.S. Pat. No. 4,477,492 (Bernga et al); and in "Spray Drying", by K. Masters, Leonard Hill Books (London-1972). Both of these references are incorporated herein by reference.

Another technique for making the spheres is a droplet method. This technique usually employs a droplet generator. In general, droplet methods are sometimes preferred because they are capable of producing spheres with very uniform diameter and wall thickness. Droplet methods and related equipment are described in various references. Examples include U.S. Pat. No. 4,163,637 (Hendricks); and an article by R. Crawley, "A Hollow Droplet Generator for Polymer Shell Production" (J. Vac. Sci. Technol. A 4 (3) May/June 1986). Both of these disclosures are incorporated herein by reference.

In one type of droplet generating system (e.g., as shown in the Hendricks patent), the desired polymer material is first combined with a blowing agent. Suitable blowing agents are well-known in the art, such as ammonium carbonate, which decomposes to form carbon dioxide and ammonia at high temperatures. Low-boiling organic solvents could also be used. As the temperature is raised, the blowing agent decomposes, and the resulting gas expands from within, forming a hollow sphere of controllable thickness. The apparatus for this type of system may comprise a droplet generator mounted on top of a drying oven. The generator forms uniformly-sized drops of a solution of the selected polymer and a blowing agent. These drops then fall into an oven, where the solution solvent is evaporated, leaving a relatively solid particle of the polymer. The solid particle then falls into a higher-temperature zone of the oven e.g., at a temperature between about 70° C. to about 120° C. below the decomposition temperature of the polymer, wherein the blowing agent decomposes, resulting in the spheres. The spheres could be collected or segregated by a variety of techniques, e.g., dust collection equipment.

Another type of droplet generating system is described by Rembaum in U.S. Pat. No. 4,929,400, which is incorporated herein by reference. The process described therein involves the polymerization of the material for the spheres, during their formation. (However, such a process could be modified to function with previously-formed polymers as well). In one embodiment of the Rembaum process, a polymerizable liquid is fed from a supply reservoir to the droplet generator. A droplet taken from an outlet of the reservoir (e.g., by gravity or other means) is carried into a column of a gaseous environment contained within a suitable chamber. As the droplet moves through the column, it is formed into a sphere by fluid dynamic forces. The droplet then solidifies in an adjacent solidifying zone within the chamber, and can be collected in any suitable collecting vessel. Depending in part on their composition, the formed droplets can self-polymerize within the chamber. (In some cases, the droplets can be levitated within the chamber, to enhance and/or accelerate uniform polymerization) Moreover, energy-based polymerization systems can be attached (directly or indirectly) to the chamber holding the droplets. Examples include ovens, as well as stations for supplying polymerizing radiation. Other details regarding such a system are further described in U.S. Pat. No. 4,929,400.

Still another type of droplet-generating process utilizes an acoustically modulated fluid jet (AMFJ). This technique can be used to generate a stream of substantially identical droplets from a suitable polymer solution. A non-limiting example of an AMFJ-based process is described in "Polymer Shells by the Droplet Method", by L. B. Kool et al, J. Vac. Sci. Technol., Vol. 18, No. 3, April 1981. In one embodiment, portions of a polymer solution stored in a suitable vessel are ejected under pressure from the vessel, through a hypodermic needle. (The needle can be changed to accommodate a wide variety of jet diameters and fluid viscosities).

The needle in the AMFJ apparatus is attached to an audio speaker coil, so that it vibrates in a direction which is aligned with the direction of the fluid jet, thereby allowing coupling of the acoustic signal to the jet. The signal applied to the speaker is the amplified output of a sine-wave generator. The same sine wave output regulates a charging ring which surrounds the polymer jet. As described in the article of Kool, the pulse associated with the sine wave cycles can be varied, so that a pulse of up to about 500 V will arrive at the charging ring at the same time that a droplet is dropping off the fluid jet. This causes a charge to be induced on the selected droplet. Electrically-charged deflection plates (up to about 200 V) which are generally parallel to the droplet stream function to divert the charged droplets from the main stream. In this manner, a stream of consistently-sized droplets—well-spaced from each other—can be directed to a vertical tube furnace, with a minimum of turbulence.

Other details and considerations are further described in the Kool article. For example, processing conditions can be varied to adjust sphere size, shape, and wall thickness. Other equipment variables include furnace temperature, droplet size, and air flow rate. Moreover, polymer properties (as alluded to above) can also be adjusted. Exemplary factors include viscosity; molecular weight; the addition of various additives, the selection of various polymer constituents; and the like. Those skilled in the art will be able to review all of these factors and considerations, so as to tailor a process for obtaining the most appropriate hollow spheres.

The size and thickness of the hollow spheres can vary considerably, and depend on a variety of factors—many of which have been mentioned previously. The following are usually the primary factors: the amount of hydrogen desired for storage; the required pressure exerted from within the spheres for that amount of hydrogen; the characteristics of the polymer forming the spheres; the selected methods for transporting the spheres (if applicable); the method used to release hydrogen from the spheres; and the desired rate of delivery of hydrogen from the spheres. In general, the spheres will usually have an average, outside diameter of about 50 microns to about 1,000 microns. The wall thickness of the spheres will also depend in part on the factors mentioned above, and usually ranges from about 0.5 micron to about 20 microns. In the case of the range of PVA-based materials discussed previously, the spheres will usually have an average, outside diameter of about 100 microns to about 300 microns; and a wall thickness of about 1 micron to about 5 microns. However, these ranges can vary to a considerable degree. For a particular situation, those skilled in the art will be able to determine the most appropriate dimensions for the spheres, without undue consideration.

A variety of techniques may be employed to infuse the hydrogen into the hollow spheres. Any chamber which can deliver and sustain conditions of very high humidity, and then eliminate the humidity, may be suitable for accommodating the spheres. While the hydrogen can sometimes be infused into the spheres at room temperature, elevated temperatures are often preferred. As an example, in some embodiments, the temperature should be at least as high as the glass transition temperature ($T_g$), of the polymer forming the spheres, but below the decomposition temperature of the polymer. (In the case of the PVA-based materials, the temperature may range from about 150° C. to about 250° C.).

Moreover, increasing the pressure in the environment surrounding the spheres is also sometimes helpful for increasing the infusion rate of hydrogen. As a non-limiting example, the pressure within a chamber which contains the hollow spheres could be raised to a level of at least about 100 atmospheres, and in some cases, greater than about 500 atmospheres. The selection of a suitable pressure level depends in large part on sphere diameter and wall thickness, and a compromise sometimes needs to be reached between sphere wall thickness/ strength, and diffusion time. Those skilled in the art can readily determine the most appropriate pressure level for a given application. It is usually important that, during the infusion process, the pressure differential between internal and external pressure does not collapse the sphere. In some instances, it is preferable to gradually increase pressure during infusion.

Non-limiting examples of chambers suitable for the infusion of hydrogen into the spheres include various types of furnaces and ovens which can produce the desired humidity/ temperature/pressure conditions. In many embodiments, an autoclave is especially useful for this purpose. Many types of autoclaves are commercially available. In general, they are all constructed to accommodate considerable steam pressure, as well as high temperatures. In some cases, the chamber is filled or partially filled with an appropriate solvent such as water, during infusion. As an alternative, chambers or tubes which could accommodate the infusion conditions and also allow for the continuous passage of hollow spheres could also be used.

Thus, in one typical embodiment, the hollow spheres are poured or otherwise directed into the infusion chamber, which is then sealed. The temperature and pressure of the chamber are then raised. The humidity level is also raised to relatively high levels (based on the permeation factors described previously), e.g., up to at least about 70% rh (relative humidity), and preferably, at least about 80% rh. Hydrogen is then pumped into the chamber from any suitable source, e.g., from canisters or from any large-scale hydrogen storage facility. Under the prescribed conditions, the hydrogen will immediately diffuse into the spheres through the relatively porous sphere walls. (In some instances, the humidity level might be raised to levels not as high as 70%, for a more gradual infusion of hydrogen into the spheres).

After the hydrogen has infused into the spheres, the humidity in the chamber can be reduced, e.g., to less than about 1% rh, and preferably to about 0% rh. (Vacuum pumps and various other conventional systems can be used to remove the moisture). As described previously, the substantial elimination of moisture immediately causes the sphere wall to become impervious to hydrogen, thereby locking the hydrogen within the spheres.

The presence and amount of hydrogen within the spheres can be confirmed by various techniques. For example, sample-spheres could be taken from the chamber, and immersed in a fluid like mineral oil. The spheres could then be punctured, allowing gaseous contents to escape. A comparison of the size of the sphere before and after puncture allows one to determine how much hydrogen was contained in the sphere. (The spheres may have contained small amounts of impurities and other gasses, like air, but the levels of such substances should not appreciably affect this hydrogen-content estimation.) As mentioned previously, it is expected that in some instances, the spheres could contain hydrogen at a pressure of at least about 10,000 psi. The process for determining hydrogen content and pressure in the spheres could be automated. For example, a known volume of spheres could be crushed within a known, evacuated volume. Measurement of the pressure change resulting from this step will provide the desired measurements.

The filled spheres could be immediately stored for use at this stage, or they could be transported to another location for use or storage, using any conventional techniques. Handling of the spheres is relatively simple and secure, as compared to the handling of hydrogen in pressurized steel tanks or cylinders. The spheres could be stored or transported, for example, in free-flowing bulk form, in cartons, bags, or cans. Regardless of the container, steps should usually be taken to keep moisture away from the spheres. Techniques for doing this are well-known, e.g., vacuum packaging. In some embodiments, the spheres could be stored and/or transported in a liquid slurry, e.g., in a suitable anhydrous solvent. The spheres could also be blown through pipes or other conduits to a desired destination, e.g., using a suitable carrier gas.

A number of techniques are available to release the hydrogen, on demand, from the spheres. For example, the spheres could simply be fractured or punctured, so as to controllably release the gas. Many techniques for fracturing the spheres are possible. Some of them are described in U.S. Patent Application Publication 2002/0106501 A1 (Debe), which is incorporated herein by reference. (While the Debe reference relates to glass spheres, some of the processes are applicable for the present invention as well). Examples of fracturing techniques include crushing by compressive or tensile stressing; shearing; or stretching. Thermal techniques could be used as well, such as radiation heating, conduction heating, or convection heating. Moreover it may also be possible to employ acoustic means, such as sonication.

In other embodiments, the spheres may be purposefully combusted. For example, if the hydrogen were to be used directly as a fuel, e.g., for a combustion engine or turbine, the spheres could be fed directly to the combustion site. The spheres could then be burned, releasing the hydrogen gas.

In still another embodiment, the hydrogen could be released from the spheres by increasing the humidity level surrounding the spheres. Various techniques are available to increase the humidity. As mentioned previously, the humidity level could easily be increased within an autoclave or other chamber capable of supporting a controlled environment. The containers in which the spheres are transported or otherwise stored could also be equipped with systems to increase the humidity levels on demand. (As in the case of initial hydrogen diffusion, it may also be desirable to increase temperature and pressure levels, to further increase the permeability of the spheres).

As described previously, the increased humidity levels for the polymeric spheres results in the rapid flow of hydrogen out of the spheres. The hydrogen could then be used in-situ, or directed by piping or other means to a desired location for use. Moreover, the rate-of-release of hydrogen could be readily controlled. For example, adjustments in humidity levels, as well as temperature and pressure, would allow one to "meter" the hydrogen out of the spheres, or to intermittently shut off the hydrogen flow (by reducing humidity) when the gas was not needed.

An important feature of this last-mentioned embodiment relates to the ability to re-use the polymeric spheres. By varying the humidity levels according to hydrogen supply and use levels, the gas can be continuously incorporated into the spheres, and then released when needed. This "tuning" characteristic (absent in the case of glass spheres) results in significant economic and ecological advantages, while providing additional flexibility to many energy systems which rely on hydrogen.

The hydrogen delivered by the process described herein can be used for any application requiring the gas. Non-limiting examples include fuel cells; internal combustion engines; turbines or other types of engines which rely on hydrogen fuel; and chemical processes which require hydrogen, e.g., hydrogenation systems. Those skilled in the art are familiar with the design of systems and processes which employ hydrogen gas.

The reusability characteristic of the hollow spheres can be exploited in a number of ways. For example, electrolysis systems and wind-generation equipment can be used—directly or indirectly—to produce hydrogen. The hydrogen could be immediately transported to another location for use. However, as in the case of any energy production system, the hydrogen might not immediately be needed. Thus, the excess amount of the gas could be diverted to a storage station which contains the hollow spheres, and then incorporated into the spheres, as described above. When the hydrogen is needed, humidity levels could be raised in the storage station, so as to release a selected amount of hydrogen for use. The transportation of portions of hydrogen in and out of the supply station could be repeated many times. By this technique, the supply of hydrogen to any destination can be "leveled out", which can be extremely advantageous in a number of industrial applications.

FIG. 1 is a simplified, non-limiting process diagram for some embodiments of this invention. Hydrogen gas is obtained from a suitable hydrogen source 10, and infused into hollow spheres 12. The infusion is carried out under conditions of relatively high humidity, as described previously. The spheres can be contained within any suitable storage container 14. When the hydrogen is needed for an application, it is released from the spheres by a variety of techniques, e.g., combustion, high humidity, or mechanical fracture. The hydrogen can then be directed to the desired destination 16. (As mentioned above, the hydrogen-filled spheres themselves can be directed to destination 16, followed by release of the hydrogen, according to any technique described herein).

Some exemplary embodiments have been described in this specification. However, numerous substitutions, modifications, and alterations are possible, without departing from the spirit and scope of the invention, as defined in the claims which follow.

What is claimed is:

1. A method for storing hydrogen, comprising the following steps:
   (a) infusing hydrogen into hollow spheres which have gas-permeable walls, wherein the spheres comprise a polymer which
      (i) has a tensile strength sufficient to contain hydrogen under selected internal pressure conditions; and
      (ii) has a permeation coefficient which can be adjusted under variable humidity conditions; and then
   (b) adjusting the humidity level so that the walls of the spheres become substantially impermeable to hydrogen, so as to prevent the release of hydrogen from the spheres.

2. The method of claim 1, wherein the spheres have an average outside diameter in the range of about 50 microns to about 1,000 microns.

3. The method of claim 1, wherein the spheres have an average wall thickness of about 0.5 micron to about 20 microns.

4. The method of claim 1, wherein the humidity level is adjusted to less than about 1% relative humidity in step (b).

5. The method of claim 1, wherein the hydrogen is infused through the walls of the hollow spheres by subjecting the spheres to a humidity level of at least about 70% relative humidity, in a chamber which comprises hydrogen.

6. The method of claim 5, wherein the humidity level is at least about 80% relative humidity.

7. The method of claim 5, wherein the pressure in the chamber is at least about 100 atmospheres.

8. The method of claim 5, wherein the temperature in the chamber during step (a) is at least as high as the $T_g$ of the polymer forming the spheres; and less than the decomposition temperature of the polymer.

9. The method of claim 1, wherein the polymer for the hollow spheres has a tensile strength sufficient to contain hydrogen at a pressure of at least about 3,000 psi.

10. The method of claim 1, wherein the polymer is selected from the group consisting of polyvinyl alcohols; carbohydrates; polyacrylonitrile; polyamines; combinations of any of the foregoing; and derivatives of any of the foregoing.

11. The method of claim 1, wherein the polymer is selected from the group consisting of polyvinyl alcohol; copolymers derived from polyvinyl alcohol; and blends containing polyvinyl alcohol.

12. The method of claim 11, wherein the polymer is a polyvinyl alcohol derivative selected from the group consisting of polyvinyl aceral, polyvinyl butyral, ethylene-vinyl alcohol (EVOH) copolymers, and combinations thereof.

13. The method of claim 10, wherein the carbohydrate comprises a polysaccharide polymer.

14. The method of claim 13, wherein the polysaccharide polymer is selected from the group consisting of cellulose polymers, starch polymers, and combinations thereof.

15. The method of claim 1, wherein the hollow spheres are made from a technique selected from the group consisting of spray drying and droplet generation.

16. The method of claim 1, further comprising the step of releasing a selected amount of the hydrogen in the spheres at a selected time after step (b), by subjecting the spheres to a humidity level sufficient to make the walls of the spheres permeable to the passage of the selected amount of hydrogen.

17. The method of claim 1, further comprising the step of releasing a selected amount of the hydrogen in the spheres at a selected time after step (b), by fracturing or perforating at least a portion of the spheres.

18. The method of claim 17, wherein the hollow spheres are perforated by a compression technique.

19. The method of claim 1, further comprising the step of releasing a selected amount of the hydrogen from the spheres at a selected time after step (b), by combusting the spheres.

20. The method of claim 1, further comprising the steps of releasing a selected amount of the hydrogen from the spheres at a selected time after step (b), and directing the released hydrogen to at least one hydrogen-consuming system selected from the group consisting of fuel cells; turbine engines; internal combustion engines; chemical process operations, and combinations thereof.

21. A method for storing and releasing hydrogen, comprising the following steps:
(I) infusing hydrogen into hollow spheres which have gas-permeable walls, wherein the spheres comprise a polyvinyl polymer or derivative thereof; and the infusion is carried Out under humidity conditions sufficient to make the walls of the spheres permeable to the passage of hydrogen;
(II) storing the hydrogen within the hollow spheres by lowering the humidity level, so that the walls of the spheres become substantially impermeable to hydrogen; and
(III) releasing a selected amount of the hydrogen from the spheres at a selected time after step (II), by increasing the humidity surrounding the spheres, and directing the released hydrogen to at least one hydrogen-consuming system selected from the group consisting of fuel cells; turbine engines; internal combustion engines; chemical process operations, and combinations thereof.

22. The method of claim 21, wherein the hydrogen is stored in the spheres at a pressure in the range of about 3,000 psi to about 10,000 psi.

23. The method of claim 21, wherein the spheres have an average outside diameter in the range of about 50 micron to about 1,000 microns;
and an average wall thickness of about 0.5 micron to about 20 microns; and are made from a spray drying or droplet-generation process.

24. A collection of hollow polymeric spheres, comprising a polymer selected from the group consisting of polyvinyl alcohols; carbohydrates; polyacrylonitrile; polyamines; combinations of any of the foregoing; and derivatives of any of the foregoing, wherein the polymeric spheres have an average diameter in the range of about 50 microns to about 1,000 microns, and the interior of the spheres comprises hydrogen gas at a pressure of at least about 3,000 psi.

25. A storage container, comprising the collection of hollow polymeric spheres recited in claim 24.

26. An apparatus for storing and delivering hydrogen, comprising:
(A) a hydrogen source;
(B) a collection of hollow polymeric spheres, comprising a polymer selected from the group consisting of polyvinyl alcohols; carbohydrates; polyacrylonitrile; polyamines; combinations of any of the foregoing; and derivatives of any of the foregoing, wherein the polymeric spheres have an average diameter in the range of about 50 microns to about 1,000 microns, and the spheres are capable of containing hydrogen gas at a pressure of at least about 3,000 psi;
(C) a chamber which contains the polymeric spheres and which is capable of allowing them to be exposed to variable conditions of humidity, heat, and pressure; wherein adjustments of humidity alter the permeability of the spheres to hydrogen, to allow for hydrogen storage or hydrogen release through the walls of the sphere; and
(D) means for directing the released hydrogen to a hydrogen destination.

27. The apparatus of claim 26, wherein the chamber of element (C) comprises an autoclave.

28. The apparatus of claim 26, wherein element (D) comprises a conduit system through which the hydrogen can pass.

29. The apparatus of claim 26, wherein the means for releasing hydrogen from the spheres according to element (C) comprises equipment for changing the humidity surrounding the spheres.

30. The apparatus of claim 26, further comprising at least one additional means for releasing hydrogen from the spheres, selected from the group consisting of equipment for fracturing or perforating the spheres; and equipment for combusting the spheres.

* * * * *

UNITED STATES PATENT AND TRADEMARK OFFICE
CERTIFICATE OF CORRECTION

PATENT NO. : 7,749,304 B2  
APPLICATION NO. : 11/342495  
DATED : July 6, 2010  
INVENTOR(S) : Kool Page 1 of 1

It is certified that error appears in the above-identified patent and that said Letters Patent is hereby corrected as shown below:

In Column 13, Line 13, in Claim 12, delete "aceral," and insert -- acetal, --, therefor.

In Column 13, Line 49, in Claim 21, delete "Out" and insert -- out --, therefor.

In Column 14, Line 9, in Claim 23, delete "micron" and insert -- microns --, therefor.

Signed and Sealed this
Fifth Day of July, 2011

David J. Kappos
*Director of the United States Patent and Trademark Office*